US008842116B2

(12) United States Patent
Kozlov et al.

(10) Patent No.: US 8,842,116 B2
(45) Date of Patent: Sep. 23, 2014

(54) METHOD AND APPARATUS FOR RENDERING AND MODIFYING TERRAIN IN A VIRTUAL WORLD

(75) Inventors: Semen Kozlov, Burlingame, CA (US); David Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 338 days.

(21) Appl. No.: 13/354,779

(22) Filed: Jan. 20, 2012

(65) Prior Publication Data

US 2013/0187914 A1 Jul. 25, 2013

(51) Int. Cl.
*G06T 17/00* (2006.01)
(52) U.S. Cl.
USPC .......................................... 345/420
(58) Field of Classification Search
CPC .................. A63F 2300/6009; G06T 19/20
USPC ................................ 345/420, 423
See application file for complete search history.

(56) References Cited

U.S. PATENT DOCUMENTS

2008/0293464 A1* 11/2008 Cheng et al. ................. 463/3
2012/0169715 A1* 7/2012 Noh et al. .................. 345/419

FOREIGN PATENT DOCUMENTS

KR    1020070042825    *  6/2007

OTHER PUBLICATIONS

Hai-liang et al. "View-dependent fast real-time generating algorithm for large-scale terrain", Science Direct; Procedia Earth and Planetary Science 1 (2009) 1147-1151.*
Rami et al. "Real Time Physically-Based Modeling and Simulation of Cratering and Fragmentation of Terrain" SAGE Simulation 2007.*
Wendel "Designing and Editing 2.5-Dimensional Terrain in StarLogo TNG"; 2006 Massachusetts Institute of Technology.*

* cited by examiner

*Primary Examiner* — Maurice L McDowell, Jr.
(74) *Attorney, Agent, or Firm* — Donald R. Boys; Central Coast Patent Agency, Inc.

(57) ABSTRACT

A system for rendering virtual terrain includes an Internet-connected server and software executing on the server from a non-transitory physical medium, the software providing a first function for building a basic terrain from geometric blocks, a second function for analyzing surrounding terrain properties, a third function for adding or subtracting blocks from the terrain, and a fourth function for smoothing the final terrain surfaces.

19 Claims, 6 Drawing Sheets

METHOD AND APPARATUS FOR RENDERING AND MODIFYING TERRAIN IN A VIRTUAL WORLD

CROSS-REFERENCE TO RELATED DOCUMENTS

NA

BACKGROUND OF THE INVENTION

1. Field of the Invention

The present invention is in the field of two-dimensional and three-dimensional computer animation and pertains particularly to methods and apparatus for rendering and modifying simulated terrain in a virtual world.

2. Discussion of the State of the Art

In the field of computer animation, gaming platforms exist that enable users, who may be content creators or company programmers, as well as players, with the aid of computing appliances to access a two-dimensional or three dimensional game or virtual world and interact with various game features, many of which are built by and are modifiable by users. In typical art, terrain rendering or building involves a user creating virtual terrain and then adding to it or otherwise modifying the terrain to suit game playing requirements for themselves and other users.

Terrain and some other features of virtual environments may be built using virtual blocks or bricks that are categorized in the game system and that are accessible through a content server or the like connected to the server running the virtual environment. In these cases, adding blocks is controlled through physical simulation in the terrain building process. One limitation to this approach is that the number of blocks that can be added to a terrain as well as the expediency of the process is limited by the available computational resources provided by the simulation engine.

Therefore, what is clearly needed is a method and apparatus for rendering and modifying terrain in a virtual environment that does not rely solely on the physics simulator controlling the environment.

SUMMARY OF THE INVENTION

The problem stated above is that ample computational resource is desirable for building terrain in a virtual world. Building and gaming processes require significant computational resources for both physical simulation and rendering, but the amount of such resources is typically limited. The inventors therefore considered functional elements of a gaming system, looking for components that exhibit computation feasibility that could potentially be harnessed to provide terrain rendering and attenuation but in a manner that would not create limits on scalar dimensioning or computational resources.

Every virtual world is propelled by physics simulation, one by-product of which is a finite amount of computational capacity for building gaming features including virtual terrain. Most virtual worlds employ game servers, content servers, and physics simulation engines to enable feature modification, feature rendering, and game play. Physics simulators running on powerful servers are typically a part of such apparatus.

The present inventor realized in an inventive moment that if, during interaction with a virtual world, terrain defining the physical area or boundaries of a virtual world could be rendered without relying on shared computational resources of a physics simulator to manage the physics of automatic terrain rendering and modification, a significant increase in the size of simulated terrain might result. The inventor therefore constructed a unique method and system for modifying and rendering virtual terrain that allows wedging, which allows shapes other than a cube, and a method to do so in an automated way so authoring may be still as simple as with cube representation. A significant expansion of the capacity to create and modify virtual terrain results with no impediment to simulated motion or to the gaming process as a whole.

Accordingly, in an embodiment of the present invention, a system for rendering virtual terrain is provided including an Internet-connected server and software executing on the server from a non-transitory physical medium, the software providing a first function for building a basic terrain from geometric blocks, a second function for analyzing surrounding terrain properties, a third function for adding or subtracting blocks from the terrain, and a fourth function for smoothing the final terrain surfaces.

In a preferred embodiment, the geometric blocks are symmetrical portions of a cube. In a variation of this embodiment, the geometric blocks are wedges or triangles. In another variation of the embodiment, the geometric blocks are rectangular portions of a cube. In the embodiment supporting wedges or triangles, the geometric blocks are vertical or corner wedges. In one embodiment, the terrain surface comprises ground and grass surfaces. In one embodiment, the blocks are stored on a voxel grid.

In one embodiment, scalar motions with a computing input device are used to build terrain or to remove terrain. In one embodiment, physical impact simulations are programmed to destroy specific amounts of terrain the destruction zones characterized by an impact signature. In a preferred embodiment, terrain features include one or a combination of hills, mountains, cliffs, plateaus, canyons, vertical formations, caves, arches, tunnels, and craters.

In one embodiment, the third function adds terrain by analyzing the surrounding terrain and selecting blocks to add by appropriate shape and orientation for placement. In one embodiment, the Internet-connected server is a game server. In the embodiment supporting physical impact simulations, the impact signature is a crater and the simulation is that of a bomb dropping on the terrain. In a variation of this embodiment, the impact signature is a tunnel and the simulation is that of a laser beam. In one embodiment, the software further includes an interface for building terrain, the interface including at least one slider control characterizing at least one terrain property.

According to an aspect of the present invention, a method for adding terrain to a virtual world terrain simulation with the aid of a computing appliance having access to the simulation and software executing on an Internet-connected server from a non-transitory physical medium comprising the steps (a) determining a portion of terrain for modification, (b) inputting information, the information characterizing at least the amount of terrain to be added, (c) analyzing the terrain surrounding the terrain portion of step (a) in light of the information provided in step (b), (d) selecting blocks to add to the terrain based on the analysis of step (c), the selection process including selection of block shape and orientation, and (e) placing the blocks according to their selection order and orientation.

In one aspect, step (a) is a manual step performed by a user. In one aspect of the method in step (b), the information is input using a computing input device such as a mouse, keyboard, or a touch screen. In a preferred aspect in step (c), the analysis includes shape and orientation of the surrounding terrain. In one aspect, the Internet connected server is a game server.

BRIEF DESCRIPTION OF THE DRAWING FIGURES

DETAILED DESCRIPTION

The inventors provide a unique system and methods for rendering virtual terrain in a virtual world or game that enables a user to build terrain that is much larger than existing terrains relative to the number of blocks available for terrain building while requiring fewer computational resources to render and then edit the terrain. The present invention will be described in enabling detail using the following examples, which may describe more than one relevant embodiment falling within the scope of the present invention.

Figure 1:
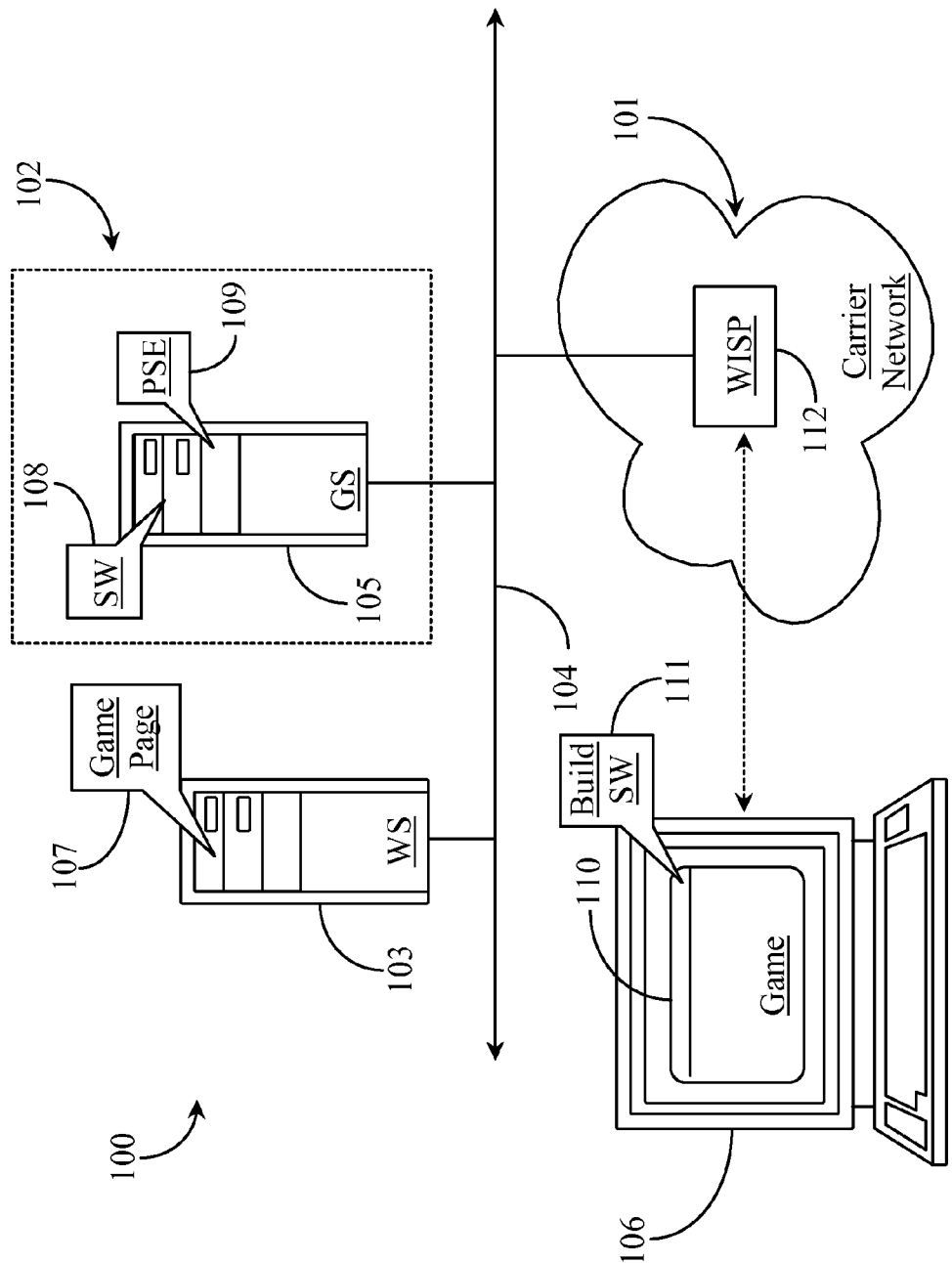
FIG. 1 is an architectural overview of a gaming network supporting virtual world terrain rendering and modification according to an embodiment of the present invention.

FIG. 1 is an architectural overview of a gaming network 100 supporting virtual world terrain rendering and modification according to an embodiment of the present invention. Gaming network 100 includes an Internet network illustrated herein by a network backbone 104. Backbone 104 includes all of the lines, equipment, and access points that make up the Internet network as a whole including any connected sub networks. Therefore, there are no geographic limitations to the practice of the present invention. Network backbone 104 supports a web server (WS) 103. WS 103 includes a non-transitory physical medium that contains all of the software and data required to function as a web server capable of serving web pages.

A third-party web hosting service may host WS 103, or an enterprise offering Internet-based gaming services may host WS 103. An enterprise service provider 102 represents an enterprise offering Internet-based gaming services including builder tools enabling clients to create their own games or virtual environments. Clients of enterprise 102 access services through a public website including a game page 107. Game page 107 may be personalized to clients and may include one or more scrollable pages listing various games available for play in addition to other opportunities such as engaging in social interaction with other clients and participating in a builders club, whereby clients register to receive tools for building games, game pieces or components, and virtual environments.

Enterprise service provider 102 hosts a gaming server (GS) 105 in this example. GS 105 includes a non-transitory physical medium containing all of the software and data required to function as a gaming server including a physics simulation engine (PSE) 109 incorporated to manage the physical simulation of games and virtual environments hosted on server 105. It will be appreciated by the skilled artisan that other servers providing dedicated functions may be present in this example without departing from the spirit and scope of the present invention. Such additional servers that may be present in enterprise domain 102 may include one or more file servers, image servers, and data servers.

A gaming client is represented in this embodiment by a laptop-computing appliance 106. Laptop computing appliance 106 has Internet access in this example, through a wireless carrier network 101 and a Wireless Internet Service Provider (WISP) 112. Laptop 106 may instead be some other variation of computing appliance such as a gaming box, a personal computer (PC), an android device, a cellular phone, an iPad, or any other appliance that is capable of browser-based navigation of the Internet. Carrier network 101 may be a wired or wireless network without departing from the spirit and scope of the present invention. In this example, carrier network 101 is a wireless digital network.

In a preferred embodiment of the present invention, clients of service provider 102 have the opportunity to register with a premium service to acquire the opportunity to build games and virtual environments. This is facilitated by builder's software 111 illustrated as running in a tool bar associated with a web display 110, which may include active display of a game or game workspace a client is working in. Build SW 111 includes tools for creating game components and accessories for existing games as well as tools for use in creating environments including buildings, terrain, avatars, vehicles, and the like. Terrain builder components of the present invention are included in the list of tools available to builder's club members.

In existing gaming applications, creation and rendering of terrain, buildings, and other gaming components depends on the computational resources of a physics simulation engine such as PSE 109 running on gaming server 105. However, in this example PSE 109 does not influence creation and rendering of components like blocks used to create terrain. Terrain may include features like hills, valleys, mountains, cliffs, plateaus, canyons, ridges, and any other formations that might be created by adding or removing individual building blocks like vertical formations, caves, arches, tunnels, trenches, and craters. Such building blocks are virtual pieces having specific geometries and properties. Such pieces may be stored in a repository such as on a volumetric pixel (voxel) grid for storing two and three-dimensional object values.

The inventors provide software 108 executing from a non-transitory physical medium associated with gaming server 105. Software 108 enables creation, rendering, and user-directed modification of virtual terrain without relying on computational resources afforded by PSE 109. SW 108 includes a first function for building a basic terrain from geometric blocks, and a second function for analyzing terrain surrounding areas of a virtual terrain that are subject to modification. SW 108 provides a third function for orchestrating addition and removal of terrain once a basic terrain has been rendered, and a fourth function for smoothing terrain surfaces after adding or removing terrain during a terrain modification sequence directed by a user.

SW 108 works in conjunction with build SW 111 to aid the user in generating and editing virtual terrain in this example. However, creating and rendering virtual terrain should not be construed as a limitation of the present invention as SW 108 may be adapted to aid in generating buildings, and other virtual structures and architectures without departing from the spirit and scope of the present invention. In this embodiment terrain is exemplified because of its inherent reliance on heavy computational resources in rendering, modification, and attenuation of rough edges without the aid of the present invention.

In practice of the invention, a user operating laptop 106 accesses game page 107 hosted on server 103 and invokes build software 111 to create and render a basic virtual terrain that may be incorporated into one or more virtual games or environments. A toolbar for creating, rendering, and modifying terrain may be provided in the browser-based interface (110) of the user while connected to the service. The user may invoke a terrain builder button or icon within the toolbar to begin generating a basic terrain. Such input by the user results in presentation of a terrain-building interface that includes one or more user-operated controls for setting the original parameters of the terrain to be rendered. These parameters may include, but are not limited to length, width, amplitude, and frequency parameters associated as editable properties of the terrain.

The user may set the desired terrain attributes using the presented interface and activate a terrain generation button or icon that results in automated rendering of the terrain in the workspace according to the user's pre-set parameters. In the course of rendering, SW 108 works in the background to dynamically select the correct terrain blocks and place them in the correct orientation throughput the rendering process. SW 108 works, in one embodiment, independently from PSE 109 and therefore does not rely upon computational resources of PSE 109 in terrain generation. However, all of the terrain building blocks are registered with PSE 109 and may be subject to normal physical simulation during game play activities. In this way computational resources of PSE 109 are reserved for other functions such as game play simulation. In another embodiment, SW 108 relies on PSE for computational resources whereby the computational capacity utilized in terrain rendering is greatly reduced resulting in potential for creating much larger and more geographically diverse terrains than would otherwise be possible using the same computational resources.

SW 108 works in the background in an automated fashion based on user input. The terrain-building interface may also include editing tools for adding and removing terrain from the terrain originally rendered. In one embodiment, build SW 111 is a plug-in that is downloaded to the user's browser 110. In another embodiment, build SW 111 runs on game page 107 hosted by server 103 wherein no download is required for operation. User input registered through SW 111 is communicated to SW 108 during both terrain rendering and terrain modification sequences performed by the user. The available functions performed to render terrain and to modify existing terrain are controlled by algorithmic function based on user input relieving the user of physical manipulation of individual blocks governed by PSE 109. More detail regarding terrain generation and modification with the aid of SW 108 is provided later in this specification.

Figure 2:
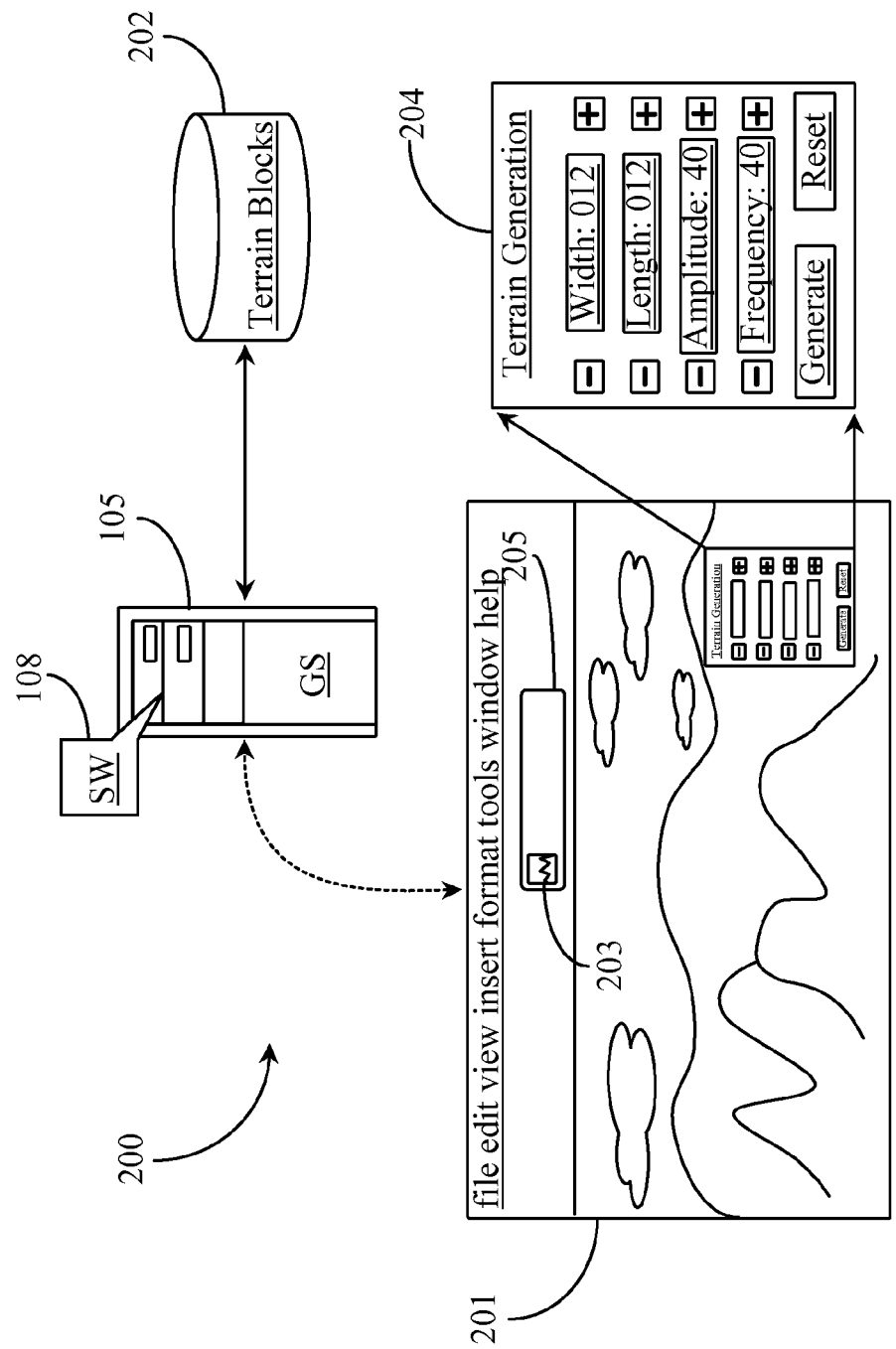
FIG. 2 is a block diagram characterizing a user interface for generating terrain for a virtual environment according to an embodiment of the present invention.

FIG. 2 is a block diagram characterizing a user interface 201 for generating terrain for a virtual environment according to an embodiment of the present invention. Interface 201 is a browser-based or browser-nested interface available to user's having authorization to build virtual terrain through the builder's club utilizing SW 111 of FIG. 1. Interface 201 includes all of the browser menus, sidebars, and other selectable options typically found in browser-based software. In this example, a toolbar 205 is provided by the inventors and incorporated into SW 111. Toolbar 205 includes at least one selectable option (button 203) for generating virtual terrain.

A user may select button 203 to begin the terrain creation process. Invocation of terrain creation button 203 results in presentation of a terrain-generation panel or interface 204. Terrain generation panel 204 includes the terrain attributes width, length, amplitude and frequency. Other attributes might be included within terrain generation panel 204 without departing from the spirit and scope of the present invention. Each attribute includes the attribute name and a value field representing the user-controlled value for the individual setting.

In this example, each attribute of the terrain to be generated has a plus button and a minus button for pre-setting the initial value for that terrain attribute. A user simply clicks and holds a plus or minus button to change the value for an attribute. Therefore, creating more width in the terrain is possible by clicking and holding the plus icon associated to the width attribute of the terrain. The attributes amplitude and frequency determine how hilly or mountainous the generated terrain will be. For example, setting high values for amplitude and frequency may generate extremely mountainous terrain that cannot be navigated without a vehicle like a helicopter or plane. High amplitude and lower frequency settings may generate higher mountains but at less frequency over the surface of the terrain. Selecting a low amplitude and higher frequency may produce hills, but at a greater frequency over the surface of the terrain.

A user operating panel 204 pre-sets all of the attribute value fields by operating the plus and minus buttons until the user is satisfied with the presets. The user may then invoke a terrain generation button provided for the purpose. If the user is not satisfied with the generated terrain based on the preset attribute values, the user may select the reset button to return to the original state before the last terrain settings were applied. After the user has preset all of the attribute values for generation of the virtual terrain and selects the terrain generation button, SW 111 communicates the information to SW 108 for generating the terrain according to the terrain attributes preset by the user.

The software dynamically selects the appropriately shaped terrain blocks and places then in the required orientations to create the effect of a robust but less blocky and smoother terrain such as hilly ground with a grass surface. SW 108 runs in the background and the terrain ordered by the user automatically renders in real time in the workspace of interface 201. SW 108 accesses the appropriate terrain blocks from a mass repository including a voxel grid adapted to store the scalar/vector block values.

A key to reducing computational requirements for rendering virtual terrain is to provide geometric portions of a cube as the individual building blocks for the terrain. These geometric portions are symmetrical and equally proportional to the other geometric portions of the cube. That is to say that the blocks are designed to fit together and a specific quantity of the blocks having identical shape and volumetric attributes recombined defines the cube space. As such, these blocks can be stored and accessed using less computational resources than would otherwise be required for individual building blocks of various shapes and sizes.

In one embodiment, the blocks are identically sized wedges or triangles that when combined in appropriate number and orientation reform the cube-space defining their collective volumes. In the case of wedge shapes, they may be corner wedges or vertical wedges. Additional shapes may also be incorporated into the process without departing from the spirit and scope of the present invention. Another computational advantage of using symmetrical portions of a cube-space as a building block for terrain is that the nature of the pre-engineered shapes of the individual blocks enables less focus on attenuation of the offset edges of the shapes when incorporated into the overall terrain. For example, wedge shapes can be orientated differently in the terrain to present smaller offsets in the edges of adjacent blocks leading to terrain that is less blocky and more visually appealing. The reduction in computational requirements for placing and smoothing the blocks in a virtual terrain results in the ability to use many more blocks than is typically practical for most gaming platforms.

Figure 3:
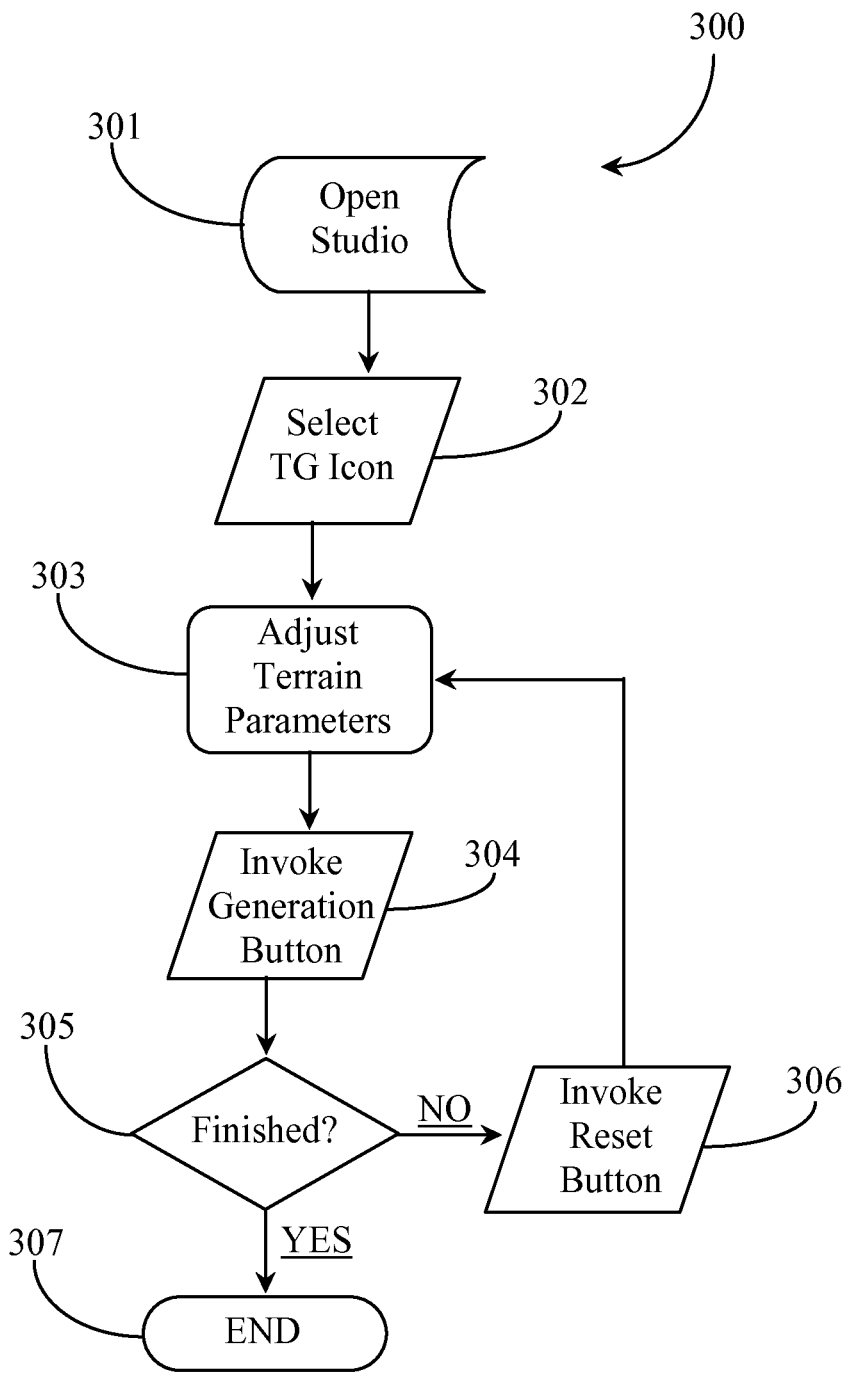
FIG. 3 is a process flow chart characterizing steps for generating terrain according to an embodiment of FIG. 2.

FIG. 3 is a process flow chart 300 characterizing user directed steps for generating terrain according to an embodiment of FIG. 2. It is assumed in this process that a user is connected to an Internet gaming page like game page 107 and has authorized access to a set of builder tools analogous to SW 111 of FIG. 1. At step 301, the user opens a builder application referenced herein as a build studio application. This action results in a presentation of a toolbar or other menu containing a terrain builder option represented by an interactive button or icon. The user selects the terrain generation (TG) icon at step 302. The TG icon may be presented in a toolbar or menu along with various and sundry options for building other game elements and accessories. Selection of the TG icon results in presentation to the user of a terrain generation interface or panel analogous to panel 205 of FIG. 2.

At step 303, the user adjusts the terrain parameters within the panel. The terrain parameters for initial terrain generation may include the width of the terrain, the length of the terrain, the amplitude of the terrain, and the frequency of the terrain. It is noted herein that the latter two parameters are closely associated with the amplitude governing the height of hilly and mountainous terrain and the frequency governing how tightly or compacted the terrain features are over the surface or space of the terrain. Once the values of the terrain attributes are preset, the user invokes the terrain generate button at step 304 to automatically render the terrain according to the preset parameters.

The user may visualize the terrain as it is rendered in the user's workspace. At step 305, the user determines whether or not they are finished generating terrain. For example, if at step 305 the user determines that they are not satisfied with the current generated terrain, the user may select a reset button in the terrain generation panel at step 306. Invoking the reset button resets a modified terrain to its originally rendered state or a just-rendered terrain to a zero terrain state allowing the user to begin over. If the user is satisfied with the terrain generated in step 304, then the process may end at step 307. It is noted that this process only addresses initial terrain generation and not subsequent editing options relative to that terrain. More detail about editing existing terrain generated according to an embodiment of the present invention is provided later in this specification.

Figure 4:
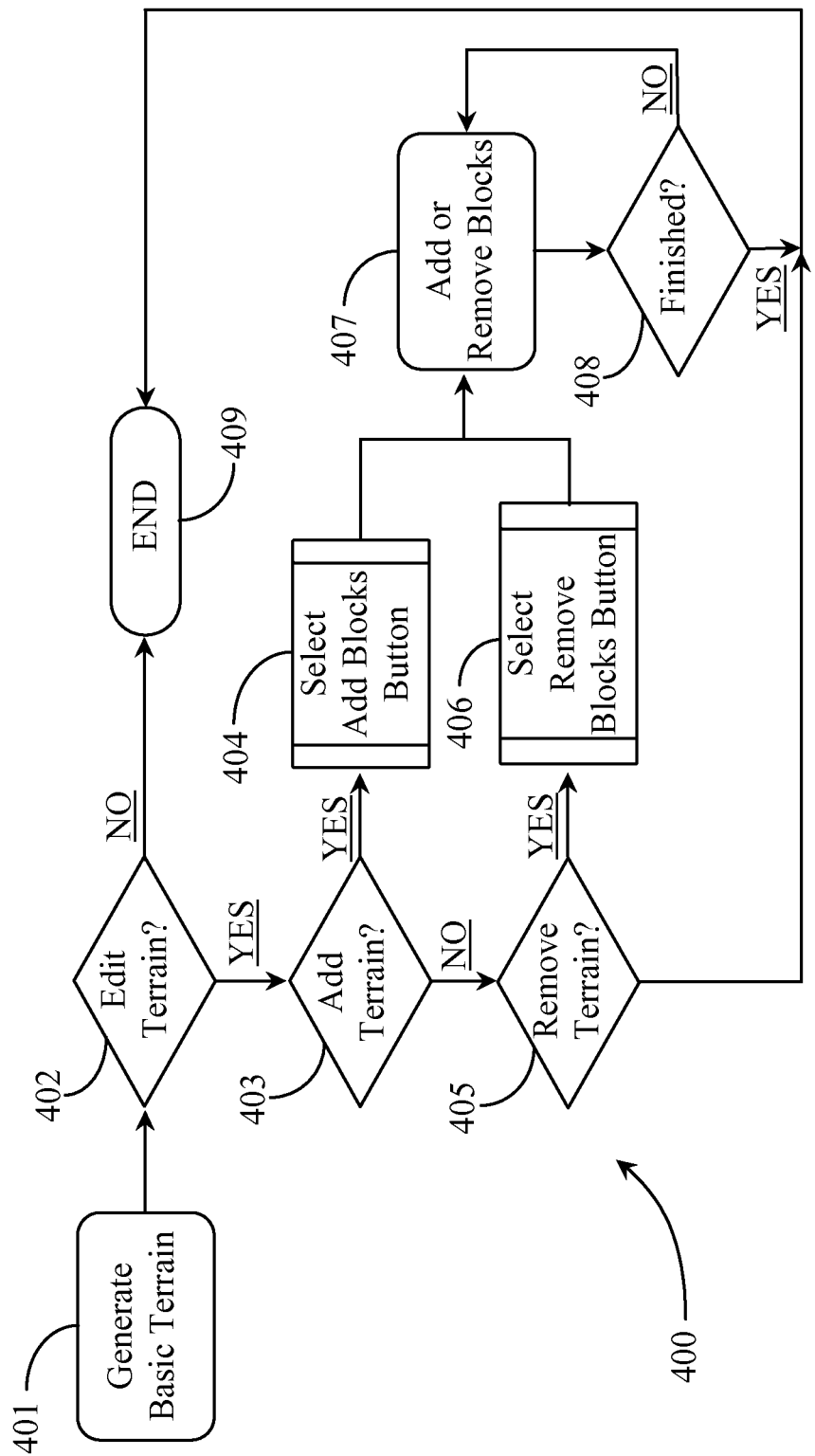
FIG. 4 is a process flow chart characterizing steps for modifying generated terrain according to an embodiment of the present invention.

FIG. 4 is a process flow chart 400 characterizing user directed steps for modifying generated terrain according to an embodiment of the present invention. At step 401, the user generates terrain using the process of FIG. 3. At step 402, the user makes a decision whether to edit the existing terrain or not to edit the existing terrain.

If the user decides not to edit the generated terrain, the process may end for that user at step 409. If the user determines that terrain will be edited at step 402, the user may decide whether or not to add terrain to the existing model at step 403. If the user decides to add terrain at step 402, the user may select an add blocks option or button at step 404. If the user determines not to add terrain at step 403, the user may be prompted to decide whether or not to remove terrain at step 405. If the user decides not to add terrain at step 405, the process may resolve to step 409 and end for that user.

If the user decides to remove terrain at step 405, the user may select a remove blocks button at step 406. In the case of adding or removing terrain, the process moves to step 407 where the user may physically add or remove terrain. It is noted herein that either edit button (add/remove) may have a pre-engineered value associated thereto specifying a volume or amount of blocks to add or to remove. This value could be adjusted to specify, for example, one block at a time, several blocks at a time, or more than several blocks at a time. The functions of add and remove blocks from the generated terrain may be realized physically by keyboard stroke, mouse movement, or some other input signature like voice or touch screen movement.

At step 407, the user adds or removes blocks by clicking on the area of the terrain to add blocks to or remove blocks from according to the mode selected. The function operates similarly to a zoom and zoom out feature where depending on selected mode, subsequent clicks zoom in on a graphic by a percentage for each click or subsequent clicks zoom out on a graphic by a percentage for each click. The user may go back and select either mode (addition or removal) so that the user may add some terrain and remove some terrain at will and in real time by changing modes.

User input relative to adding or removing terrain is characterized in this example by a mouse click or some other user directed computer input activity such as touch screen manipulation or keyboard stroke. At each input event, the information associated with the event such as add or remove and the amount of blocks that will be affected is communicated to an algorithm associated to software 108. Therefore, at each click the result is the prescribed addition or removal of blocks of the terrain. Automated enhancements performed by SW 108 include orientating the blocks during block addition and smoothing or blending the surface edges of the added terrain. Likewise, the algorithm smoothes or blends the remaining edges of terrain after blocks are removed.

At step 408, the user determines if he or she is finished editing the terrain. If the user is not finished editing the terrain at step 408, then the process moves back to step 407 for continuation of the process. If the user is finished editing terrain at step 408, the process ends at step 409 for that user. It is noted herein that there may be other user-directed actions that may be pre-engineered for adding or removing terrain. For example, a virtual bomb may be created that may be dropped from a virtual plane over any portion of terrain in order to destroy a prescribed amount of terrain. In this case, physical impact simulations such as a bomb exploding on the ground are pre-programmed to destroy specific amounts of terrain, the destruction zones characterized by visible impact signatures such as a crater, for example.

Terrain may be removed by a user operating a virtual laser beam or projectile launcher from the air (virtual plane) or from the ground (rocket launcher) in another example. In this case the destruction of terrain is characterized by terrain fragmentation and disassociation from the area of terrain by the physical force simulated by the operated component. A larger bomb would destroy more terrain than a smaller bomb as a more concentrated laser may cut more terrain than a less concentrated one, etc. Terrain might also be consumed such as by eruption, erosion, fire, or by other ways that might be simulated relative to physics. In the case of terrain alteration by destruction, the PSE (109) is directly involved in the simulation. Adding or removing blocks via mouse click to edit terrain can be handled solely by SW 108 and the associated algorithm without utilizing computational resources of the physics simulation engine.

It is also noted herein that the amount of blocks to add or remove per user event may be regulated by the scalar characteristics of a user input event. For example, in building terrain, a sweeping motion directed vertically upward might provide scalar information to software 108 specifying an amount of blocks to add relative to the scale of the motion. To add width, a user may use a touch screen motion of expanding the fingers to cause blocks to be added to both sides of an existing vertical feature to add thickness to the feature. Similar motions can be employed when removing blocks. For example, the user may use a cutting or planning motion to remove the top of a mountain to create a plateau. A circular motion with a finger on a cliff wall may be employed to erode or drill out a tunnel. In one embodiment, a water cannon may be employed to erode blocks.

Simulated weather may also be used to shape terrain over time. There are many possibilities. The physics engine may simulate user-directed block destruction events including scattering of and throwing up of terrain blocks, etc. However, a combination of rendering responsibilities might provided between PSE 109 and SW 108 such as block removal by algorithm (no residue) and dust scattering as a secondary simulation provided by the PSE that is not directly tied to block removal.

Figure 5:
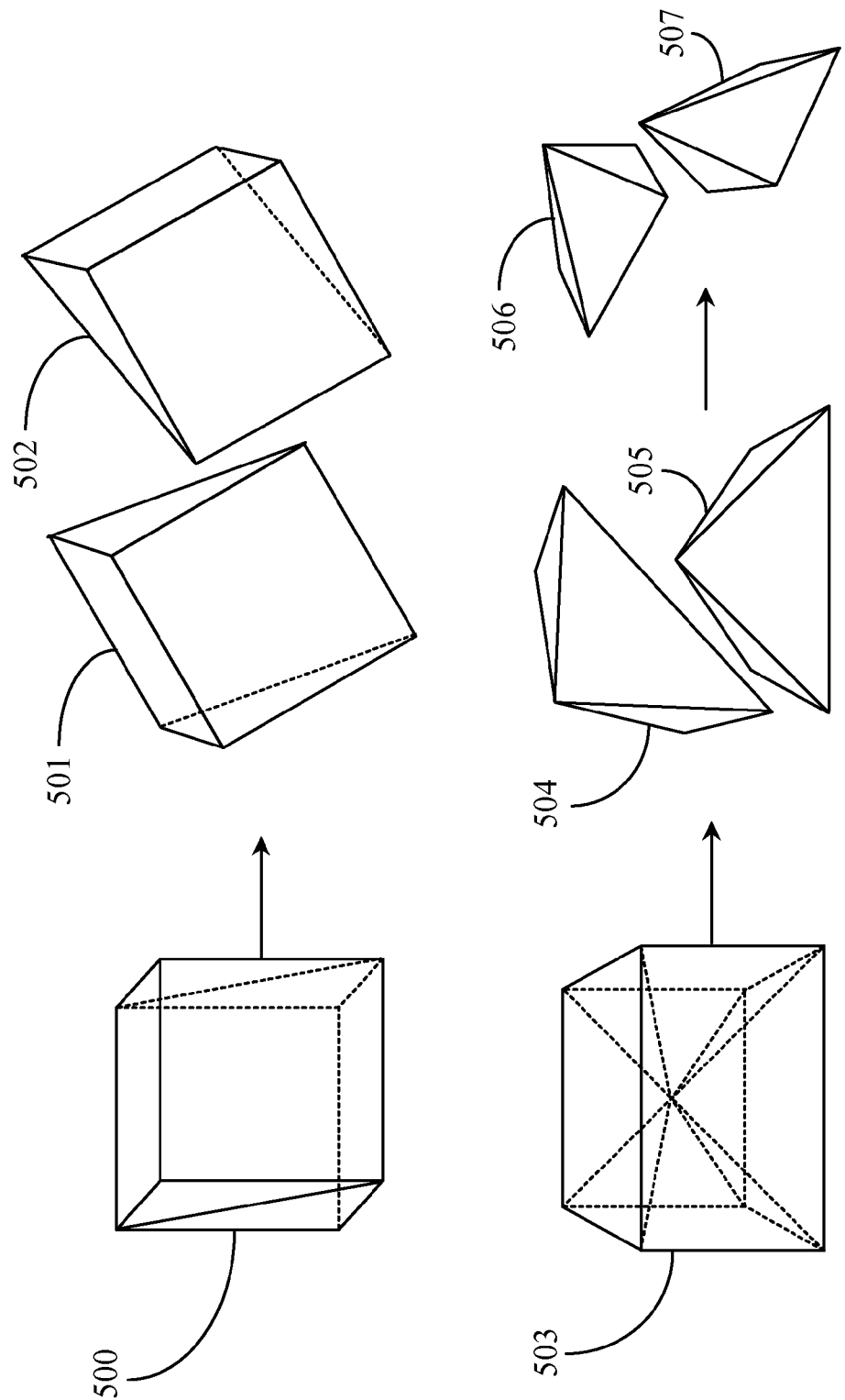
FIG. 5 is a block diagram characterizing various symmetrical divisions of a cube used as terrain building blocks according to an embodiment of the present invention.

FIG. 5 is a block diagram characterizing various symmetrical divisions of cubes 500 and 503 used as terrain building blocks according to an embodiment of the present invention. In this example, cube 500 is divided into two identical wedge components 501 and 502. Blocks 501 and 502 may be orientated and placed into the terrain in any manner as long as the blocks fit to each other similar to Lego blocks and to the blocks in the existing terrain that are already placed by the algorithm. Cube 503 is divided into four pyramids that are of the same size and shape, two of which are illustrated in rotated views as pyramid 504 and pyramid 505. In one embodiment the pyramidal shape may be further divided to form polygonal shapes 506 and 507, which are identical in shape and size.

It will be apparent to the skilled artisan, having understood the division of a cube into component shapes to allow wedging, that there may be many other ways than those shown for dividing a cube into component shapes and portions.

Cube space may be divided into other shapes of equal size and proportion without departing from the spirit and scope of the present invention. In one embodiment, the blocks are rectangular portions of the cube space. In one embodiment, the blocks are wedges or triangles. In one embodiment, the blocks are vertical wedges or corner wedges.

Figure 6:
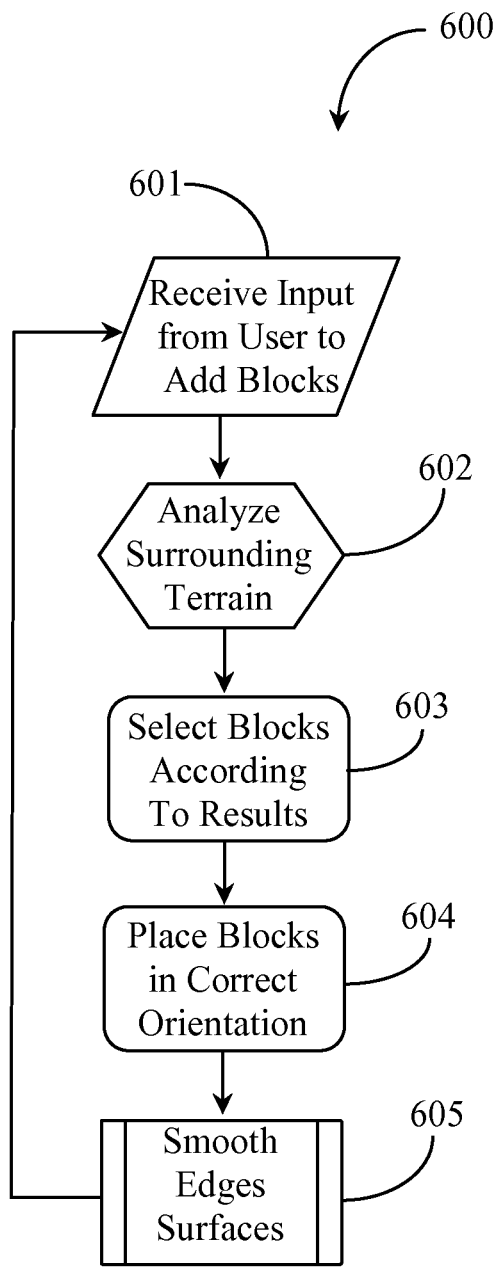
FIG. 6 is a process flow chart characterizing a software driven process for adding terrain to existing terrain according to an embodiment of the present invention.

FIG. 6 is a process flow chart 600 characterizing a software directed process for adding terrain to existing terrain according to an embodiment of the present invention. This process assumes the user has selected the mode for adding terrain physically and has initiated an event to add terrain such as a mouse click or other input event on the portion of the terrain to be built up. At step 601, the algorithm receives input from the user to add blocks. This is communicated from the user interface to the game server or other server hosting software 108 of FIG. 1. At step 602, the software analyzes the surrounding terrain to determine the positions and block shapes adjacent to the portion of the terrain that will be built up. This may be accomplished using coordinate information, orientation data and block shape information recorded during the initial terrain rendering process.

In this process there may a variety of algorithms that may be implemented for selecting block shapes and placing blocks. Basic to the process is the nature of the surrounding elements at any position where changes or additions may be made. For example, given a 3D voxel grid, for any block in the voxel grid, there are 26 adjacent blocks that touch on the face, edge, or corner. That is the one block being considered is is the central block in a 3×3×3 set of 27 blocks, each of which is an immediate neighbor. Each of the 26 surrounding voxels can either be in an empty of populated state. Given the state of these 26 adjacent block positions being empty or populated, there is, in one embodiment, a function that uniquely defines the appropriate wedge shape for the center block.

At step 603, the software dynamically selects the blocks required for the addition according to the information received from step 601 and the results of analysis at step 602. At step 604, the algorithm places the selected blocks in correct orientation and according to the information received at step 601. At step 605, the algorithm runs an attenuation mechanism to smooth or blend the edges and surfaces of the blocks placed into the terrain.

The process loops through steps 601 to 605 for every perceived user-directed event. Blocks may be serially selected and serially placed according to user-directed events, which may include mouse clicks, touch screen motions, and so on. The algorithm works in a similar process for removing terrain with step 601 providing input to remove blocks, step 602 and 603 unchanged, with step 604 omitted.

In one embodiment, the process of adding or removing blocks is directed by a user operating a touch screen wherein scalar information associated with a particular user motion determines whether blocks are removed or added and what amount of blocks are removed or added per user-directed event. It will be apparent to one with skill in the art that user-directed events may also be characterized by sweeping dimensional indications of large portions of terrain for modification wherein terrain is elevated in mass or de-elevated in mass adding or removing many blocks per user-directed event.

It will be apparent to one with skill in the art that the virtual terrain generation and editing system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A system for rendering virtual terrain, comprising:
an Internet-connected server; and
software executing on the server from a non-transitory physical medium, the software providing:
a first function for building a basic terrain from geometric blocks;
a second function for analyzing surrounding terrain properties;
a third function for adding or subtracting blocks from the terrain by at least analyzing the surrounding terrain and selecting blocks to add by appropriate shape and orientation for placement; and
a fourth function for smoothing the final terrain surfaces.

2. The system of claim 1, wherein the geometric blocks are symmetrical portions of a cube.

3. The system of claim 1 wherein the geometric blocks are wedges or triangles.

4. The system of claim 3, wherein the geometric blocks are vertical or corner wedges.

5. The system of claim 1, wherein the geometric blocks are rectangular portions of a cube.

6. The system of claim 1, wherein the terrain surface comprises ground and grass surfaces.

7. The system of claim 1, wherein the blocks are stored on a voxel grid.

8. The system of claim 1, wherein scalar motions with a computing input device are used to build terrain or to remove terrain.

9. The system of claim 1, wherein physical impact simulations are programmed to destroy specific amounts of terrain creating destruction zones characterized by an impact signature.

10. The system of claim 9, wherein the impact signature is a crater and the simulation is that of a bomb dropping on the terrain.

11. The system of claim 9, wherein the impact signature is a tunnel and the simulation is that of a laser beam.

12. The system of claim 1, wherein terrain features include one or a combination of hills, mountains, cliffs, plateaus, canyons, vertical formations, caves, arches, tunnels, and craters.

13. The system of claim 1, wherein the Internet-connected server is a game server.

14. The system of claim 1, further including an interface for building terrain, the interface including at least one slider control for characterizing at least one terrain property.

15. A method, provided by an Internet-connected computerized server, for adding terrain to a virtual world terrain simulation with the aid of a computing appliance having access to the simulation and software executing on the Internet-connected computerized server from a non transitory physical medium, the software performing the steps of:
(a) determining a portion of terrain for modification;
(b) inputting information, the information characterizing at least the amount of terrain to be added.
(c) analyzing the terrain surrounding the terrain portion of step (a) in light of the information provided in step (b);
(d) selecting blocks to add to the terrain based on the analysis of step (c), the selection process including selection of block shape and orientation; and
(e) placing the blocks according to their selection order and orientation.

16. The method of claim 15, wherein step (a) is a manual step performed by a user.

17. The method of claim 15, wherein in step (b), the information is input using a computing input device such as a mouse, keyboard, or a touch screen.

18. The method of claim 15, wherein in step (c), the analysis includes shape and orientation of the surrounding terrain.

19. The method of claim 15, wherein the Internet connected server is a game server.

* * * * *